United States Patent
Wang et al.

Patent Number: 5,451,320
Date of Patent: * Sep. 19, 1995

[54] BIOLOGICAL PROCESS FOR GROUNDWATER AND WASTEWATER TREATMENT

[75] Inventors: Lawrence K. Wang, Latham, N.Y.; Lubomyr Kurylko, New Providence, N.J.; Orest Hrycyk, Syracuse, N.Y.

[73] Assignee: International Environmental Systems, Inc., USA, Latham, N.Y.

[*] Notice: The portion of the term of this patent subsequent to Jun. 16, 2009 has been disclaimed.

[21] Appl. No.: 550,515

[22] Filed: Jul. 10, 1990

[51] Int. Cl.$^6$ .................................... C02F 3/12
[52] U.S. Cl. ................................ 210/604; 210/621; 210/626; 210/631
[58] Field of Search ........ 210/631, 605, 603, 620–629, 210/663, 670, 694, 604, 610, 611, 908, 909, 615–618; 55/38, 44, 45, 47, 51, 53, 68, 74, 75; 95/10, 12, 14, 15, 117, 141, 204, 900–903

[56] References Cited

U.S. PATENT DOCUMENTS

| | | | |
|---|---|---|---|
| 3,946,534 | 3/1976 | Egly | 55/38 X |
| 4,323,372 | 4/1982 | Bentz et al. | 55/68 X |
| 4,407,717 | 10/1983 | Teletzke et al. | 210/631 |
| 4,623,464 | 11/1986 | Ying et al. | 210/631 X |
| 4,689,054 | 8/1987 | Vara et al. | 55/74 X |
| 4,715,965 | 12/1987 | Sigerson et al. | 55/74 X |
| 4,752,306 | 5/1988 | Henriksen | 55/38 |
| 4,810,386 | 3/1989 | Copa et al. | 210/631 |
| 4,820,318 | 4/1989 | Chang et al. | 55/68 |
| 4,846,852 | 7/1989 | Schweitzer et al. | 55/74 X |
| 4,857,198 | 8/1989 | Meidl | 210/631 |
| 4,859,216 | 8/1989 | Fritsch | 55/74 X |
| 4,892,664 | 1/1990 | Miller | 55/53 X |
| 4,937,004 | 6/1990 | Mandrin et al. | 55/53 X |
| 4,952,316 | 8/1990 | Cooley | 210/631 |
| 4,956,093 | 9/1990 | Pirbazari et al. | 210/631 |
| 4,966,611 | 10/1990 | Schumacher et al. | 55/74 X |
| 5,122,165 | 6/1992 | Wang et al. | 55/38 |
| 5,122,166 | 6/1992 | Hrycyk et al. | 55/38 |

FOREIGN PATENT DOCUMENTS 212771  4/1984  United Kingdom ............... 55/47

OTHER PUBLICATIONS

O'Brien, R. P. and J. L. Fisher. "There is an Answer to Groundwater COntamination." Water/Engineering & Management, May 1983.

O'Brien, R. P. and M. H. Stenzel. "Combining Granular Activated Carbon and Air Stripping." Public Works, Dec., 1984.

Stenzel, M. H. and U. S. Gupta. "Treatment of Contaminated Groundwaters with Granular Activated Carbon and Air Stripping." Journal of the Air Pollution Control Assoc., Dec., 1985.

*Primary Examiner*—Thomas Wyse

[57] ABSTRACT

A physical-biochemical process system and apparatus for removal of toxic volatile organic compounds (VOCs) and other organics from contaminated groundwater or wastewater is described. This process system involves influent pumping groundwater or wastewater treatment by air stripping, biological oxidation and powdered activated carbon (PAC) adsorption in an enclosed gas stripping bioreactor, air purification by granular activated carbon contactor, and recycling of GAC-purified air for further groundwater or wastewater treatment. The bioreactor effluent is processed processed by a clarifier, a filter and a disinfection unit. The clarifier sludge is partially recycled to the bioreactor and partially wasted. The process system is cost-effective and eliminates the problem of secondary air contamination caused by conventional gas stripping tower and coventional biological treatment processes.

14 Claims, 1 Drawing Sheet

BIOLOGICAL PROCESS FOR GROUNDWATER AND WASTEWATER TREATMENT

Inventors: Lawrence K. Wang of Latham, N.Y., USA
Lubomyr Kurylko of New Providence, N.J., USA
Orest Hrycyk of Syracuse, N.Y., USA
Assignee: International Environmental Systems, Inc., Pittsfield, Mass., USA

| Filed: | July 10, 1990 | | |
|---|---|---|---|
| Field of Search: | 34/77; 53/22; 55/20, 28, 31, 33, 38, 46, 51, 59, 61, 62, 68, 71; 210/603, 607, 616, 617, 626, 631, 650, 667, 747, 750, 800 | | |
| Reference Cited: | U.S. Patent Document | | |
| | 3,946,534 | 03/1976 Egly | 53/22R |
| | 4,323,372 | 04/1982 Bentz et al | 55/59 |
| | 4,407,717 | 10/1983 Teletzke et al | 210/616 |
| | 4,623,464 | 11/1986 Ying et al | 210/616 |
| | 4,689,054 | 08/1987 Vara et al | 55/61 |
| | 4,752,306 | 07/1988 Henriksen | 55/38 |
| | 4,715,965 | 12/1987 Sigerson et al | 210/800 |
| | 4,755,296 | 07/1988 Ying et al | 210/631 |
| | 4,810,386 | 03/1989 Copa et al | 210/616 |
| | 4,820,318 | 04/1989 Chang et al | 55/68 |
| | 4,846,852 | 07/1989 Schweitzer et al | 55/31 |
| | 4,857,198 | 08/1989 Meidl | 210/603 |
| | 4,859,216 | 08/1989 Fritsch | 55/28 |
| | 4,892,664 | 01/1990 Miller | 210/747 |
| | 4,937,004 | 06/1990 Mandrin et al | 210/750 |
| | 4,952,316 | 08/1990 Cooley | 210/616 |
| | 4,956,093 | 09/1990 Pirbazari et al | 210/616 |
| | 4,966,611 | 10/1990 Schumacher et al | 55/20 |
| | 4,168,228 | 9/1979 Mallat et al | 210/631 |
| | 4,237,002 | 12/1980 Strudgeon et al | 210/631 |
| | 4,271,013 | 6/1981 Bhattacharyya | 210/626 |
| | 4,292,176 | 9/1981 Grutsch et al | 210/631 |
| | 4,623,464 | 11/1986 Ying et al | 210/616 |
| | Foreign Patent Document: | | |
| | 2,127,711A | 05/1983 Henriksen et al (U.K.) | 55/47 |

Other Publications:
O'Brien, R.P. and J.L. Fisher. "There is an Answer to Groundwater Contamination." Water/Engineering & Management, May 1983.
O'Brien, R.P. and M.H. Stenzel. "Combining Granular Activated Carbon and Air Stripping." Public Works, December, 1984.
Stenzel, M.H. and U.S. Gupta. "Treatment of Contaminated Groundwaters with Granular Activated Carbon and Air Stripping." Journal of the Air Pollution Control Association, December, 1985.

O'Brien, R. P. and M. H. Stenzel, "Combining Granular Activated Carbon and Air Stripping" Public Works, December 1984.

Stenzel, M. H. and U. S. Gupta, "Treatment of Contaminated Groundwaters with Granular Activated Carbon and Air Stripping," Journal of the Air Pollution Control Association, December 1985.

BACKGROUND OF THE INVENTION

The present invention relates to a physical-biochemical process system for treating contaminated groundwater to remove volatile organic compounds (VOCs) and other objectionable volatile and nonvolatile contaminants from said groundwater. The process system of this invention represents a low cost and highly efficient alternative to present groundwater treatment technology which causes secondary air pollution.

About 70 percent of potable water in the U.S.A. is supplied by groundwater. Groundwater contamination, which is a national major concern, is about 71 percent caused by industrial accidents (chemical spills, tank leaks, etc.), 16 percent caused by railroad or truck's chemical accidents, and 13 percent caused by leachates from lagoons or dumpsites.

The primary reasons for treating groundwater are: potable use (39 percent), clean-up of aquifer to prevent spread of contamination (48 percent), and industrial and commercial use (13 percent). In any case, the potentially hazardous VOCs must be removed. Timely clean-up of aquifer to prevent spread of contamination is extremely important because the damage can be beyond repair if the spread of contamination is too wide.

Toxic organic compounds commonly found in groundwater include, but will not be limited to, the following:

| Organic Compounds in Groundwater | Percent of Occurrences | Concentration Range |
|---|---|---|
| Carbon tetrachloride | 5 | 130 ug/l-10 mg/l |
| Chloroform | 7 | 20 ug/l-3.4 mg/l |
| Dibromochloropropane | 1 | 2-5 mg/l |
| DDD | 1 | 1 ug/l |
| DDE | 1 | 1 ug/l |
| DDT | 1 | 4 ug/l |
| CIS-1,2-dichloroethylene | 11 | 5 ug/l-4 mg/l |
| Dichloropentadiene | 1 | 450 ug/l |
| Diisopropyl ether | 3 | 20-34 ug/l |
| Tertiary methyl-butylether | 1 | 33 ug/l |
| Diisopropyl methyl phosphonate | 1 | 1,250 ug/l |
| 1,3-dichloropropene | 1 | 10 ug/l |
| Dichlorethyl ether | 1 | 1.1 mg/l |
| Dichloroisopropylether | 1 | 0.8 mg/l |
| Benzene | 3 | 0.4-11 mg/l |
| Acetone | 1 | 10-100 ug/l |
| Ethyl acrylate | 1 | 200 mg/l |
| Trichlorotrifloroethane | 1 | 6 mg/l |
| Methylene chloride | 3 | 1-21 mg/l |
| Phenol | 3 | 63 mg/l |
| Orthochlorophenol | 1 | 100 mg/l |
| Tetrachloroethylene | 13 | 5 ug/l-70 mg/l |
| Trichloroethylene | 20 | 5 ug/l-16 mg/l |
| 1,1,1-trichloroethane | 8 | 60 ug/l-25 mg/l |
| Vinylidiene chloride | 3 | 5 ug/l-4 mg/l |
| Toluene | 1 | 5-7 mg/l |
| Xylenes | 4 | 0.2-10 mg/l |
| EDB | 1 | 10 ug/l |
| Others | 1 | NA |

The present technologies for groundwater treatment include: air stripping without air emission control, granular activated carbon, chemical oxidation, and biological processes. Air stripping without air emission control is not acceptable in many states. Granular activated carbon contactor is technically feasible for water purification, but may be economically unfeasible when it is used alone. Chemical oxidation is not cost-effective and may give undesirable residuals. Biological process for groundwater treatment has not been fully developed.

The present invention is an efficient and cost-effective groundwater purification system aiming at clean-up of aquifer to prevent spread of VOCs contamination. The purified groundwater is to be discharged to a recharging well. The present invention considers the affordability, performance, governmental acceptance, secondary pollution elimination and simplicity in operation.

Industrial or municipal wastewaters containing VOCs can also be efficiently treated by the process system of the present invention.

DESCRIPTION OF THE PRIOR ART

When contaminants are absorbed to the soils above the water table, residual contamination in the soils becomes of great concern since rainwater percolates through the soil and continues to carry the contaminants to the underground aquifer for a very long time. As a result, absorbed contaminants in the soil are the major sources of groundwater contamination.

The technically feasible process systems for soil decontamination include washing, solidification, incineration, chemical oxidation, neutralization, bio-oxidation, venting, lime treatment, etc., of which only washing, bio-oxidation, venting and lime treatment are economically feasible.

Soil washing using plain water is mainly for removal of water soluble inorganics and organics from soils. After soil-water separation, the wash water containing water soluble contaminants can be further treated by conventional physical-chemical or biological processes. If the contaminants in soil include petroleum chemicals and other volatile organics, surfactants are generally used in soil washing. In this case, the wash water after soil-water separation contains high concentrations of volatile organic compounds (VOCs), volatile inorganic compounds (VICs), surfactants and other contaminants which can not be easily or cost-effectively removed by conventional processes. The combination of washing and bio-oxidation is a common approach for treatment of the soil's wash water containing VOCs and surfactants.

Treatment of contaminated soil with lime is cost-effective, but may destroy vegetation in the environment.

Venting process works by air stripping the contaminated soils in place or off-site. Satisfactory extraction of VOCs by venting may be accomplished without excavation of soils even if the in-situ venting process is selected. The in-situ venting process is reliable, cost-effective, but will take up to five years to clean up a site contaminated by VOCs. Venting is not technically feasible for decontamination of a soil containing non-volatile pollutants.

If a site is contaminated by both volatile and non-volatile pollutants, soil washing and soil-water separation should be the first steps for inexpensive cleanup. The wash water can then be further treated by various liquid treatment processes.

The most common process systems for removal of volatile organic compounds (VOCs), non-volatile organic compounds, volatile inorganic compounds, surfactants, heavy metals, acids, etc. from a contaminated liquid include flow equalization, pH adjustment, chemical coagulation, flocculation, sedimentation, filtration, conventional air stripping tower, liquid phase granular activated carbon (GAC) adsorption, foam separation, bio-oxidation, chemical oxidation, powdered activated carbon (PAC) adsorption, etc.

Flow equalization requires a separate equalization tank. Conventional chemical coagulation and pH adjustment are done in a rapid mixing tank.

Conventional flocculation is accomplished in a slow mixing tank. Sedimentation clarifier generally requires long detention time, and a large land space. Filtration is the tertiary pretreatment prior to conventional air stripping tower. pH adjustment is an important pretreatment step for ammonia removal. Chemical coagulation, flocculation, sedimentation and filtration together are required for reduction of heavy metals, iron, manganese and hardness prior to conventional bio-oxidation or conventional air stripping and conventional liquid phase GAC for VOC removal.

Conventional air stripping tower is a simple desorption process used to lower the VOCs of a liquid stream. In the process, the contaminated liquid is pumped to the top of a tall packed tower with a countercurrent flow of air drawn through the bottom openings. VOCs are stripped from the falling water droplets into the air stream which is then discharged to the atmosphere. The effluent of air stripping tower is thus purified to lower VOCs and ammonia. For removal of VOCs and ammonium ions, a pretreatment process system comprising of chemical coagulation/flocculation, sedimentation and filtration, is generally required prior to the conventional air stripping tower to remove heavy metals, iron, manganese and hardness which, otherwise, will clog the conventional air stripping tower, in turn, will reduce air stripping efficient. Conventional air stripping towers do not recycle their gaseous effluent; therefore, they require air emission control facilities. In addition to high capital cost, conventional air stripping towers have other problems and limitations: (a) poor efficiency in cold weather locations having air temperature below 10 degree C.; (b) not working in freezing conditions unless sufficient heated air is available; (c) objectionable air emission due to ammonia and VOCs discharge into air environment; (d) poor removal efficiency when VOCs and ammonia concentrations in the liquid are low; (e) scale formation due to high heavy metals, iron, manganese and hardness contents in the liquid; (f) objectional tall construction, (g) process restriction for simultaneous combined treatment using chemicals and ultraviolet lights (UV), and (i) incapable of removing surfactants.

The gaseous effluent from a conventional air stripping tower is generally treated by gas phase granular activated carbon (GAC) contactors which can not be regenerated in-situ for reuse. The gaseous effluent from a conventional bio-oxidation process (such as activated sludge process, sequencing batch reactor, etc.) is generally not treated, thus creates air pollution problem.

The process system and apparatus of this invention significantly simplifies the site remediation system for removal of VOCs, non-volatile organic compounds, etc. from a contaminated liquid. The enclosed gas stripping bioreactor, oxidation, PAC adsorption, clarification and recycled gas emission control, are all accomplished in one package unit for cost saving. The post-treatment for final polishing of the liquid stream by a liquid phase GAC contactor is added as needed, but is no longer absolutely required. Recycling of purified gas, for reuse in the enclosed air stripping bioreactor eliminates the air pollution problem.

Conventional air stripping tower can not be cost-effectively operated in conjunction with a bio-oxidation reactor because separate reactors are required. The enclosed gas stripping bioreactor of the present invention, however, incorporates, gas stripping, bio-oxidation, and clarification into one reactor for more efficient removal of both volatile and nonvolatile pollutants.

In order to clarify the dissimilarities between the present invention and the prior arts, many direct and cross references are reviewed and cited.

Prior process for substantially eliminating dissolved oxygen from a liquid and from a shipping container is described in U.S. Pat. No. 3,946,534, issued Mar. 30, 1976 to Richard S. Egly, which relates to repeated operation by purging the container with inert gas, pressurizing with the gas and then releasing the pressure and repeating the steps for a plurality of times. Egly's patent is particularly directed to elimination of oxygen gas from a liquid, rather than to elimination of toxic volatile organics and volatile inorganics (such as ammonia) from a liquid. However, it is important to illustrate the development of the gas stripping art leading to the present disclosure.

Prior process for recovering volatile organics from exhaust gases or spent air containing these compounds using a layer of silica containing adsorbents is shown in U.S. Pat. No. 4,323,372 issued Apr. 6, 1982, to Rolf Bentz et al. The present invention relates to a process and apparatus for removing VOCs, and nonvolatile organic compounds from a liquid and also for automatic gas emission control using a gas phase GAC contactor which recycles its purified effluent for the purpose of gas stripping in an enclosed bioreactor.

A prior process for treating liquid with powdered adsorbent, and one or more biological packed towers is described in U.S. Pat. No. 4,407,717 issued Oct. 4, 1983 to Gerald H. Teletzke et al. The present invention discloses an improved process and apparatus using mainly an enclosed gas stripping bioreactor, and GAC contactors, but no biological packed towers.

The method and process for combined physicochemical and biological treatment of wastewater using powdered activated carbon (PAC) in an open sequencing batch reactor (SBR) is disclosed by Wei-Chi Ying et al in U.S. Pat. No. 4,623,464 issued Nov. 18, 1986, and in U.S. Pat. No. 4,755,296, issued Jul. 5, 1988. Their method and process removes VOCs from wastewater by PAC adsorption and biological reaction, and converts ammonia (VIC) to nitrate ions. The present invention relates to an enclosed gas stripping bioreactor for gas stripping, bio-oxidation, PAC adsorption, and gas emission control, and for direct removal of volatile and non-volatile pollutants. Besides the present invention is feasible for groundwater decontamination, and other waste treatment.

An air purification process is disclosed by Thomas E. Vara et al in U.S. Pat. No. 4,689,054, issued Aug. 25, 1987. The Vara process includes the steps of particulate filtration, adsorption, desorption, separation, incineration and venting. The present invention does not include the steps of particulate filtration, separation, incineration and venting, and relates to groundwater decontamination, and industrial effluent treatment which all with built-in air emission control.

A system for treatment of and mass transfer in liquid/gas mixtures, especially removal of oxygen from seawater, is disclosed by Norolf Henriksen in U.S. Pat. No. 4,752,306, issued Jun. 21, 1988. Henriksen's patent involves oxygen removal by an inert stripping gas. The present invention relates to utilization of air or oxygen for chemical oxidation of ferrous iron and manganese, bio-oxidation of organics, and stripping of volatile substances from liquid, in which oxygen is added, not reduced.

A method for separating volatilizable contaminants from soil is disclosed by Adam L. Sigerson et al in U.S. Pat. No. 4,715,965, issued Dec. 29, 1987, which does not relate to the enclosed gas stripping bioreactor for gas stripping and gas emission control as in the case of the present invention.

A two-stage process for purifying wastewater containing organic and adsorbable pollutants in open tanks is disclosed by William M. Copa et al in U.S. Pat. No. 4,810,386, issued Mar. 7, 1989. Their disclosed process includes the steps of aerating the wastewater in the presence of powdered activated carbon (PAC) and biologically active solids in aeration zone, and subsequently settling the suspended solids by gravity in quiescent zone. Their oxygen is provided only for biological growth in opened tanks. The present invention relates to mainly bio-oxidation and physical separation of VOCs by innovative gas bubble stripping (with any kind of gas) in an enclosed bioreactor, and physical adsorption of VOCs by PAC.

Chang et al disclose a process for removal of volatile organic compounds from vapor streams using a binderless carbon molecular sieve adsorbent in U.S. Pat. No. 4,820,318, issued Apr. 11, 1989. Another method and apparatus for separating and recovering volatile solvents from vapor streams also using molecular sieve adsorbent is disclosed by Stefan Schweitzer et al in U.S. Pat. No. 4,846,852, issued Jul. 11, 1983. The present invention relates to a process for removal of VOCs and non-volatile pollutants from liquid and gas streams by bio-oxidation, gas stripping, and adsorption.

Still another method and equipment for recovering volatile organic compounds (VOCs) from exhaust waste gas using active charcoal in fiber form is disclosed by Georges Fritsch in U.S. Pat. No. 4,859,216, issued Aug. 22, 1989. Fritsch's patent further relates to adsorption-desorption steps for active charcoal fiber regeneration and a recirculation step for the gaseous regenerating fluid through the system. The present invention relates to an enclosed gas stripping bioreactor for mainly groundwater decontamination with built-in gas emission control, and utilizes combined stripping, bio-oxidation, PAC adsorption (instead of active charcoal fiber adsorption) to remove VOCs and non-volatile pollutants from a contaminated liquid (instead of removing only VOCs from an exhaust waste gas). Furthermore, in the case of the present invention, the purified gas stream (instead of the gaseous regenerating fluid) is recirculated to the enclosed gas stripping bioreactor for liquid treatment.

Meidl discloses a process system for water decontamination by conventional air stripping tower, biological open reactor containing PAC, sedimentation/thickening and wet air oxidation, in U.S. Pat. No. 4,857,198, issued Aug. 15, 1989. The present invention relates to a liquid treatment process system comprising the steps of enclosed gas stripping bio-oxidation, PAC adsorption, and GAC adsorption, which are aimed at removal of volatile as well as non-volatile pollutants from liquid.

A similar method and system for decontaminating groundwater or other water, is disclosed by Paul C. Miller in U.S. Pat. No. 4,892,664, issued Jan. 9, 1990. Miller's patent relates a process comprising of conventional air stripping tower for groundwater treatment and catalytic oxidation for air purification. Conventional air stripping tower requires pretreatment for pH adjustment, and removal of iron, manganese, and hardness, and requires post-treatment for disinfection. Besides, conventional air stripping tower removes only VOCs and can not receive the gaseous effluent from catalytic oxidation for repeated air stripping. The present invention relates to mainly the enclosed gas stripping bioreactor for removal of VOCs and non-volatile pollutants from a contaminated liquid. The enclosed gas stripping bioreactor as in the case of the present invention has built-in pretreatment, post-treatment and recirculating air emission control capabilities.

The method for the deoxidation of chlorinated water, more particularly sea water, by means of a low oxygen content stripping gas and a liquid absorbent is disclosed by Charles Mandrin et al in U.S. Pat. No. 4,937,004, issued Jun. 26, 1990. The present invention relates to a process for removal of both volatile and nonvolatile pollutants (instead of chlorine only) from a contaminated liquid (instead of specifically chlorinated sea water) by means of a high oxygen content stripping gas (instead of a low oxygen content stripping gas).

A single-stage continuous aeration-batch sedimentation clarification process in open tanks for purifying wastewater is disclosed by Curtis D. Cooley in U.S. Pat. No. 4,952,316, issued Aug. 28, 1990. Cooley's patent further relates to the use of PAC in the aeration step. The present invention relates to the enclosed dispersed air stripping process (instead of aeration-sedimentation clarification in open tanks) for both liquid treatment as well as air emission control (instead of only for liquid treatment), and also relates to PAC & GAC contactors (instead of only PAC). Furthermore, Cooley's process is only for purifying wastewater. The process disclosed by the present inventors is feasible for groundwater decontamination, and industrial effluent treatment.

A continuous chemical pretreatment, aeration and ultrafiltration process for purifying dairy wastewater is disclosed by Massoud Pirbazari et al in U.S. Pat. No. 4,956,093, issued Sep. 11, 1990, which relates to the use of PAC in the aeration step. The present invention is mainly for treatment of either groundwater or industrial effluent (instead of only dairy wastewater) by an enclosed dispersed air stripping bioreactor (instead of an open aeration tank containing biological solids and PAC) and PAC—GAC contactors (instead of PAC alone). Furthermore, the process disclosed by the present inventors does not require the use of a chemical pretreatment tank and an ultrafiltration post-treatment unit.

Schumacher et al disclose an apparatus and process for adsorbing VOCs from the flue gas of a combustion unit in one reactor and regenerating adsorbent material in another reactor both for air emission control, in their U.S. Pat. No. 4,966,611, issued May, 1983. Their process system specifically includes adsorption, combustion, humidification, condensation, and heating. The present invention relates to removal of both volatile and nonvolatile pollutants from liquid by an enclosed air stripping bioreactor, PAC/GAC adsorption, and recycling the purified gas stream for further stripping.

SUMMARY OF THE INVENTION

In accordance with the present invention, an improved physical-biochemical process system for removing volatile and nonvolatile organic compounds from a contaminated liquid comprises the following steps, facilities and alterations:

discharging the contaminated liquid by pumping into an enclosed gas stripping bioreactor which is equipped with a liquid inlet, a liquid outlet, a gas inlet, a gas outlet, a sparger system, a vacuum breaker, a manhole with cover, an enclosure, a demister pad, a gas mover, a gas phase granular activated carbon (GAC) contactor, sampling ports, and a gas feed point, adjusting the hydraulic residence time of said bioreactor to conform to different influent liquid flow rates and providing sufficient gas head space above the liquid level in said bioreactor, feeding microorganisms, chemicals (including powdered activated carbon, or PAC) and gas into said bioreactor, for combined chemical reactions, PAC adsorption, and bio-oxidation, bubbling coarse gas bubbles up through the sparger system into liquid phase with a low pressure and low volume gas mover, stripping residual VOCs from liquid phase into gas phase in said bioreactor by physical gas stripping effect of gas bubbles, sucking the gas effluent containing VOCs from the gas outlet of said bioreactor by said gas mover, transporting said gas effluent by the gas mover through the demister pad for removal of liquid droplets, through a gas phase granular activated carbon (GAC) contactor for further removal of VOCs, and through the gas inlet for re-entering said sparger system, supplying additional gas to said sparger system, as necessary, continuously bubbling coarse gas bubbles including additional gas, up through sparger system for a plurality of times, treating the liquid inside said bioreactor for a specific residence time by coarse gas bubble stripping, chemical reactions (including chemical oxidation with oxygen), PAC adsorption and biological reactions, separating the insoluble suspended pollutants in/from the bioreactor effluent by clarification, discharging the clarified liquid effluent as the final purified liquid effluent, or into a liquid phase GAC filter for further treatment before final disposal, recycling a portion of the clarified sludge to said bioreactor for continuous biological treatment, and wasting the remaining portion of the clarified sludge, and replacing said gas phase GAC and said liquid phase GAC periodically.

BRIEF DESCRIPTION OF THE DRAWING

A schematic diagram of the present invention is shown in FIG. 1, which is divided into four major components: (1) a liquid inlet structure including an influent pump 1, and a liquid inlet 6; (2) an enclosed gas stripping bioreactor 3 including an enclosure 12, a sparger system 4, a vacuum breaker 5, a manhole with cover 11, a liqid outlet 7, and a trap 8; (3) a gas emission control system including a gas outlet 10, a demister pad 16, a gas mover 15, sampling ports 17 & 19, a gas phase GAC contactor 18, and a gas inlet 9; and (4) a liquid post-treatment system including a clarifier 20, a filter 21, a disinfection unit 22, a plant effluent pipe 23, a sludge recycle line 25, and a waste sludge line 24.

DESCRIPTION OF THE PREFERRED EMBODIMENTS

Figure 1:
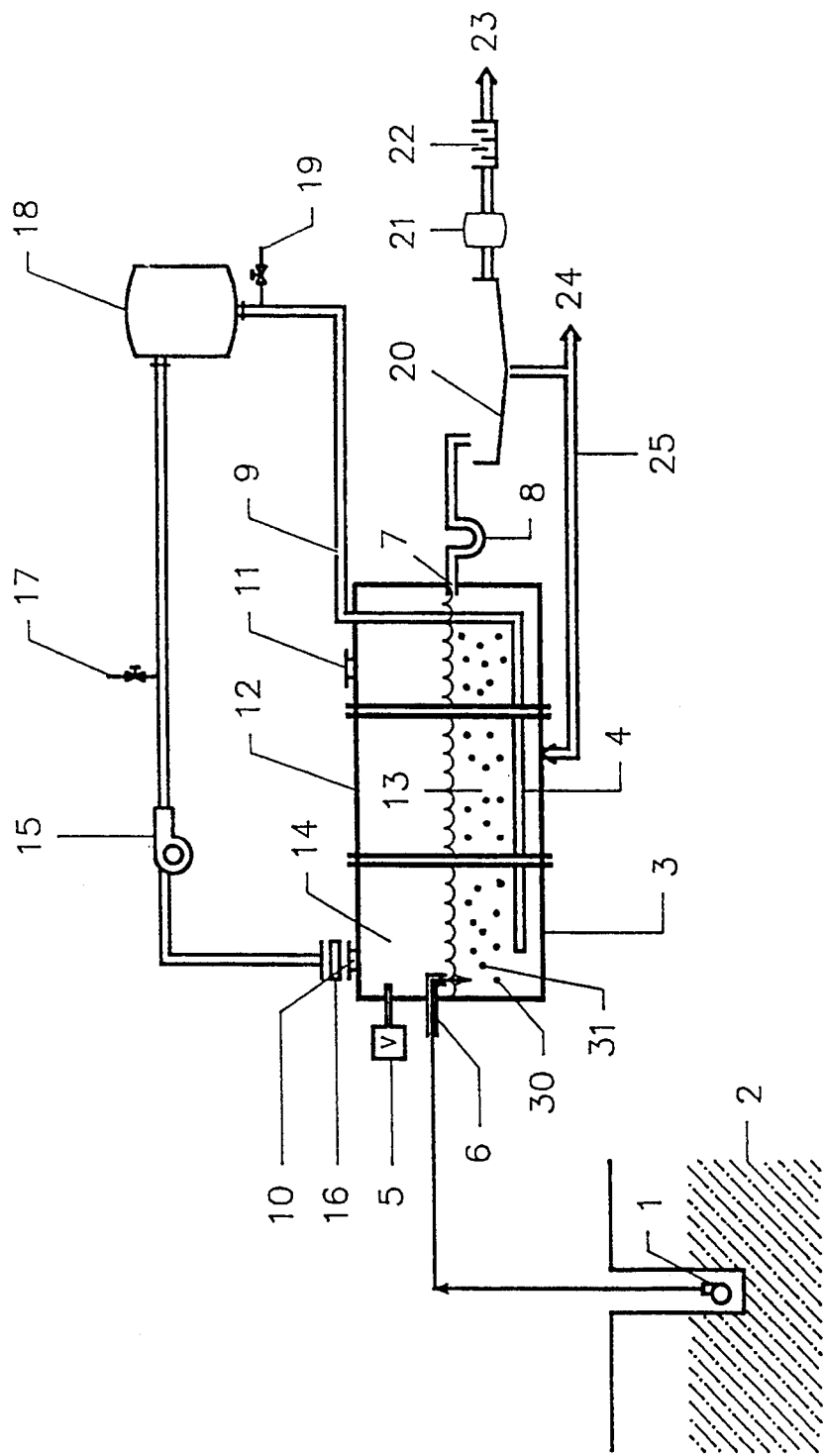

FIG. 1 is a schematic diagram of the present invention when applied to groundwater purification or wastewater treatment.

Referring to FIG. 1, an influent pump 1 feeds the contaminated liquid 2 to an enclosed gas stripping bioreactor 3, which is equipped with a sparger system 4, a vacuum breaker 5, a liquid inlet 6, a liquid outlet 7 with trap 8, a gas inlet 9 to said sparger system 4, a gas outlet 10, a manhole with cover 11, and an enclosure 12.

The sparger system 4 is a perforated pipe with spargers (or nozzles) for distribution and generation of gas bubbles.

The vacuum breaker 5 is for releasing strong vacuum built up inside said bioreactor 3 periodically.

The trap 8 controls the effluent of said bioreactor 3 to be discharged through said liquid outlet 7.

The manhole with cover 11 is for maintenance personnel to enter said bioreactor 3 for service.

The enclosure 12 is for collection of emitted gas 14 from said liquid 13 and for prevention of air pollution.

The bioreactor 3 is constructed to provide sufficient head space of gas (such as air) 14 above liquid 13 in said bioreactor 3. Gas bubbles generated from said sparger system 4 passing through the liquid 13 inside bioreactor 3 entrains volatile organic compounds (VOCs) from liquid phase 13 into gas phase 14.

The remaining VOCs and other organic contaminants are removed by the microorganisms and/or PACs in the liquid phase 13 inside said bioreactor 3. The gas 14 in said bioreactor 3 containing VOCs is sucked by a gas mover 15, and passes through the gas outlet 10 and a demister pad 16 to remove water droplets.

The preferred gas mover 15 is of low pressure (5 to 15 psi) and low volume (500 to 1500 scfm) type. The gas mover 15 is for effective collection of the emitted gas 14 from said bioreactor 3; for transportation of the emitted gas through said demister pad 16, a gas phase granular activated carbon (GAC) contactor 18, and a gas inlet 9; and or redistribution of gas bubbles through said sparger system 4.

The dehumidified gas is sampled at an inlet sampling port 17 before it is purified by a gas phase granular activated carbon (GAC) contactor 18.

The gas phase GAC contactor 18 removes the VOCs from the gas stream transported by said gas mover 15. Gradually the gas phase GAC is building up VOCs. Periodically, the gas phase GAC must be replaced with virgin GAC, regenerated GAC, treated GAC, granular activated alumina, ion exchange resin, manganese oxide, magnesium oxide, calcite, dolomite, or combinations thereof.

The GAC purified gas stream is sampled at an outlet sampling port 19, and is recycled to said bioreactor 3 via the gas inlet 9 and the sparger system 4 for continuous gas stripping and biological treatment of said liquid 13 for a plurality of times.

The purified liquid 13 in said bioreactor 3 flows through the liquid outlet 7 and a trap 8 and is further treated by a required clarifier 20, a liquid phase filter 21 and a disinfection unit 22. The plant effluent 23 is further treated or discharged.

The sludge from said clarifier 20 is partially recycled via a sludge recycle line 25 to the bioreactor 3, and partially discharged as waste sludges 24.

The enclosed gas stripping bioreactor 3 and the gas emission control system 9, 10, 11, 12, 15, 16, 17, 18 & 19 together are completely enclosed, thus eliminating any air emissions or secondary pollution.

The present invention is specific for organic compounds. Most of VOCs are removed by GAC contactor in the vapor phase rather than aqueous phase. The remaining organic compounds are removed by the microorganisms and powdered activated carbons (PACs) in said bioreactor 3. Removal of VOCs by conventional GAC filter in aqueous phase is hindered by the other organic and inorganic compounds competing for adsorption sites on the liquid phase GAC. Consequently, more VOCs are removed by the present invention's gas phase GAC in the vapor phase than that removed by conventional liquid phase GAC in the aqueous phase.

We claim:

1. A continuous process for removing organic compounds from a contaminated water comprises the following steps:

discharging the contaminated water by pumping into an enclosed biological modular sparging aeration chamber which is equipped with a water inlet, a water outlet, an air inlet, an air outlet, a sparger system, a vacuum breaker, a manhole with cover, an enclosure, and an air recycle system; said air recycle system further comprising a demister pad, an air mover, a contactor, valves, sampling ports, and an air feed point, adjusting the hydraulic residence time of said sparging aeration chamber to conform to different influent water flow rates and providing sufficient air head space above a water level in said sparging aeration chamber, feeding microorganisms, air and chemicals including powdered activated carbon into said sparging aeration chamber, for removal of said organic compounds including volatile organic compounds by a biochemical reaction, bubbling air bubbles from said sparger system through a water phase with a low pressure and low volume air mover; said sparger system being located near bottom of said sparging aeration chamber, physically stripping residual volatile organic compounds from the water phase into an air phase in said sparging aeration chamber by air bubbles, thereby forming an air stream, transporting, purifying and recycling the air stream from said enclosed sparging aeration chamber with said air recycle system comprising said air mover, said demister pad, said sampling ports, said contactor, an additional air feed point, valves, air pipes, sucking the air stream containing volatile organic compounds from the air outlet by said air mover, transporting said air stream by the air mover through the demister pad for removal of water droplets, through said contactor for further removal of volatile organic compounds, and through the air inlet for re-entering said sparger system of the sparging aeration chamber, supplying additional air to said sparger system, repeating the step of said bubbling air bubbles from said sparger system through said water phase with said low pressure and low volume air mover for a plurality of times, treating the water inside said sparging aeration chamber for a specific residence time by physical air bubble stripping, chemical reaction and said biochemical reaction, thereby producing a water effluent of said sparging aeration chamber, discharging the water effluent of said sparging aeration chamber through a water outlet with a trap into a clarification unit; said trap further preventing external air intrusion into said sparging aeration chamber, separating the insoluble microorganisms, chemicals and organic compounds from the water effluent of said sparging aeration chamber by said clarification unit, thereby producing a clarified effluent ,and a separated sludge, discharging the clarified effluent from said clarification unit as a final purified effluent, or into a post-treatment system; said post-treatment system further comprising a filter, a disinfection unit, a sludge recycle pipe, a sludge discharge pipe, and a final effluent discharge pipe, for further treatment before final disposal, and recycling a portion of the separated sludge from said clarification unit to said sparging aeration chamber for continuous biochemical reactions, and wasting the remaining portion of the separated sludge from said clarification unit.

2. The process of claim 1 wherein said contaminated water is selected from the group consisting of groundwater, surface water, industrial effluent, sewage, landfill leachate, saline water, or combinations thereof.

3. The process of claim 1 wherein the contactor contains granular media which is selected from the group consisting of virgin granular activated carbon, regenerated granular activated carbon, polymeric adsorbents, activated alumina, ion exchange resin, manganese oxide, magnesium oxide, calcite, dolomite, or combinations thereof.

4. The process of claim 1 wherein said chemical reaction and biochemical reaction are accomplished by powdered activated carbon and microorganisms, respectively.

5. The process of claim 1 wherein the clarification unit is selected from the group consisting of flotation clarification, sedimentation clarification, or both flotation clarification and sedimentation clarification.

6. The process of claim 1 wherein said filter is selected from the group consisting of single media filter, multi-media filter, diatomaceous earth filter, cartridge filter, granular activated carbon filter, or combinations thereof.

7. The process of claim 1 wherein said disinfection unit is selected from the group consisting of UV, chlorination, ozonation, or combinations, thereof.

8. A batch process for removing organic compounds from a contaminated water comprises the following steps:

discharging the contaminated water by pumping into an enclosed biological modular sparging aeration chamber which is equipped with a water inlet, a water outlet, an air inlet, an air outlet, a sparger system, a vacuum breaker, a manhole with cover, an enclosure, and an air recycle system; said air recycle system further comprising a demister pad, an air mover, a contactor, valves, sampling ports, and an air feed point, providing sufficient air head space above a water level in said sparging aeration chamber, feeding microorganisms, air and chemicals including powdered activated carbon into said sparging aeration chamber for removal of said organic compounds including volatile organic compounds by a biochemical reaction, starting to bubble air bubbles up through said sparger system and a water phase inside said sparging aeration chamber, with a low pressure and low volume air mover, for physically stripping residual volatile organic compounds from said water phase into an air phase in said sparging aeration chamber by air bubbles, treating the water inside said sparging aeration chamber for a specific residence time by physical air bubble stripping, chemical reaction and said biochemical reaction, transporting, purifying and recycling the air stream from said enclosed sparging aeration chamber with said air recycle system comprising said air mover, said demister pad, said sampling ports, said contactor, an additional air feed point, valves, and air pipes, turning off said air mover and the sparger system inside said sparging aeration chamber, not to generate air bubbles, separating the insoluble microorganisms, chemicals and organic compounds in an effluent of said sparging aeration chamber by a batch clarification step, thereby producing a batch clarified effluent, and a separated sludge, discharging the batch clarified effluent either as a final purified effluent, or into a post-treatment unit; said post-treatment unit further comprising a filter, a disinfection unit, sludge pipe means, and final effluent discharge means for further treatment before final disposal, keeping a portion of the separated sludge separated by said batch clarification step for said biochemical reaction, and wasting the remaining portion of the separated sludge, and repeating the above steps of the batch process for a plurality of times for operating the sparging aeration chamber together with said air recycle system, and the post-treatment system.

9. The process of claim 8 wherein said contaminated water is selected from the group consisting of groundwater, surface water, industrial effluent, sewage, landfill leachate, saline water, or combinations, thereof.

10. The process of claim 8 wherein the batch clarification is selected from the group consisting of flotation clarification, sedimentation clarification, or both flotation clarification and sedimentation clarification.

11. The process of claim 8 wherein the contactor contains granular media which is selected from the group consisting of virgin granular activated carbon, regenerated granular activated carbon, polymeric adsorbents, activated alumina, ion exchange resin, manganese oxide, magnesium oxide, calcite, dolomite, or combinations thereof.

12. The process of claim 8 wherein said filter is selected from the group consisting of single media filter, multi-media filter, diatomaceous earth filter, cartridge filter, granular activated carbon filter, or combinations thereof.

13. The process of claim 8 wherein said disinfection unit is selected from the group consisting of UV, chlorination, ozonation, or combinations thereof.

14. The process of claim 8 wherein said chemical reaction and biochemical reaction are accomplished by powdered activated carbon and microorganisms, respectively.

* * * * *